Figure 1:
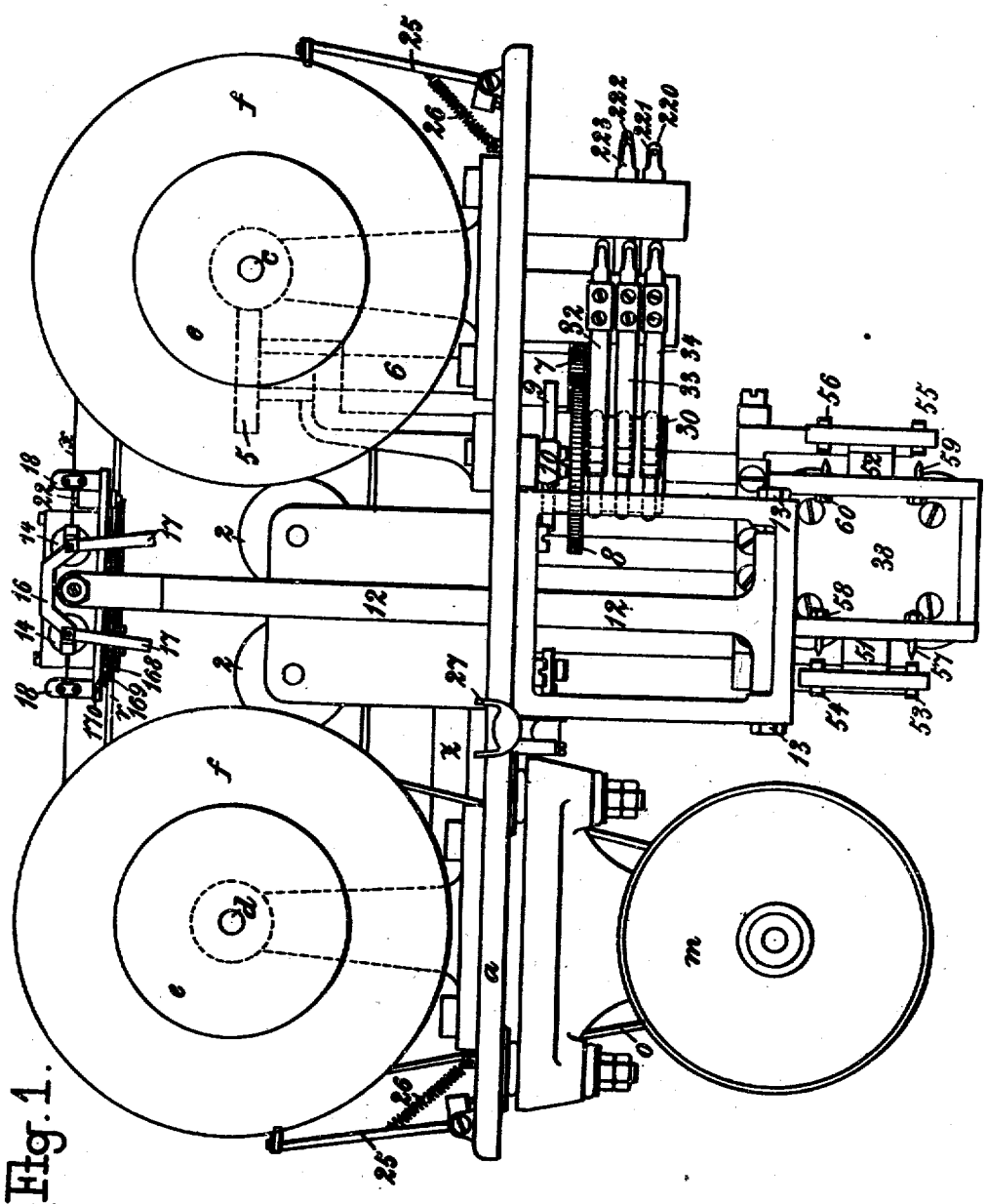

E. A. HYTTEN.
TELEGRAPHONE APPARATUS.
APPLICATION FILED DEC. 31, 1907.

909,414.

Patented Jan. 12, 1909.
14 SHEETS—SHEET 1.

WITNESSES:

INVENTOR:
EJNAR. A. HYTTEN.
BY
ATTORNEYS.

E. A. HYTTEN.
TELEGRAPHONE APPARATUS.
APPLICATION FILED DEC. 31, 1907.

909,414.

Patented Jan. 12, 1909.
14 SHEETS—SHEET 2.

WITNESSES:

INVENTOR:
EJNAR A. HYTTEN
BY Rosenbaum & Stockbridge
ATTORNEYS

E. A. HYTTEN.
TELEGRAPHONE APPARATUS.
APPLICATION FILED DEC. 31, 1907.

909,414.

Patented Jan. 12, 1909.
14 SHEETS—SHEET 5.

WITNESSES:
Frank S. Ober
Waldo M. Chapman

INVENTOR:
EJNAR A. HYTTEN,
BY
ATTORNEYS.

E. A. HYTTEN.
TELEGRAPHONE APPARATUS.
APPLICATION FILED DEC. 31, 1907.

No. 909,414.

Patented Jan. 12, 1909.
14 SHEETS—SHEET 6.

WITNESSES:

INVENTOR:
EJNAR A. HYTTEN.
BY
ATTORNEYS.

E. A. HYTTEN.
TELEGRAPHONE APPARATUS.
APPLICATION FILED DEC. 31, 1907.

909,414.

Patented Jan. 12, 1909.
14 SHEETS—SHEET 7.

WITNESSES:

INVENTOR:
EJNAR A. HYTTEN,

BY
ATTORNEYS

E. A. HYTTEN.
TELEGRAPHONE APPARATUS.
APPLICATION FILED DEC. 31, 1907.
909,414.
Patented Jan. 12, 1909.
14 SHEETS—SHEET 8.
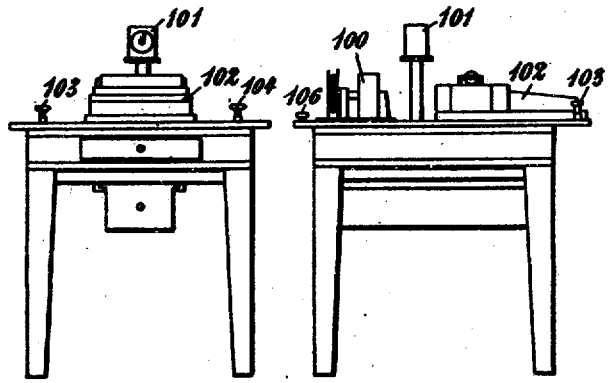
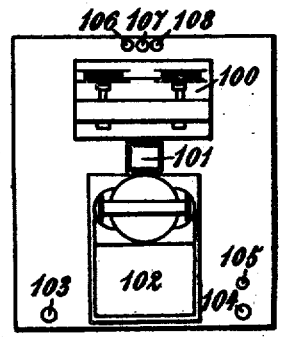
WITNESSES:
INVENTOR:
EJNAR A. HYTTEN
BY
ATTORNEYS

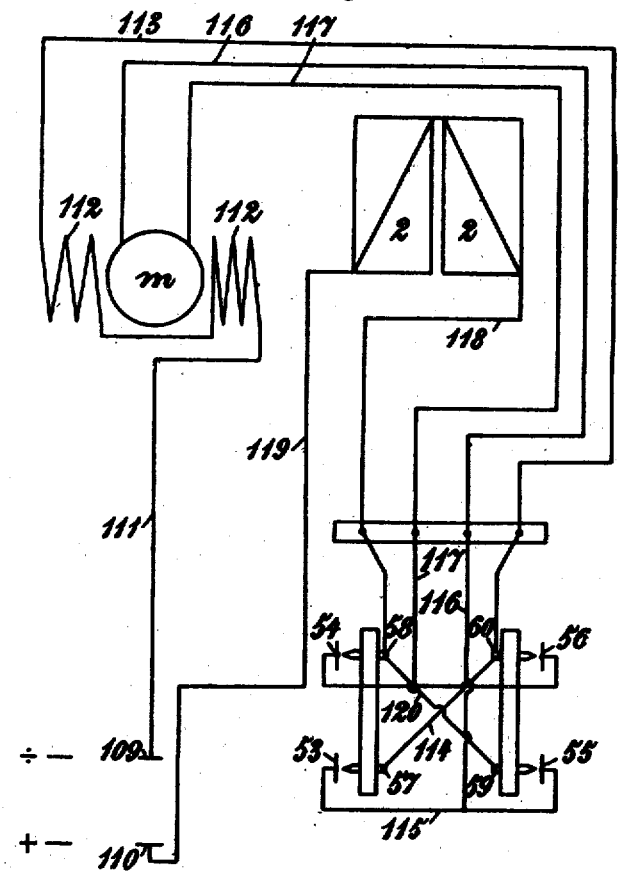

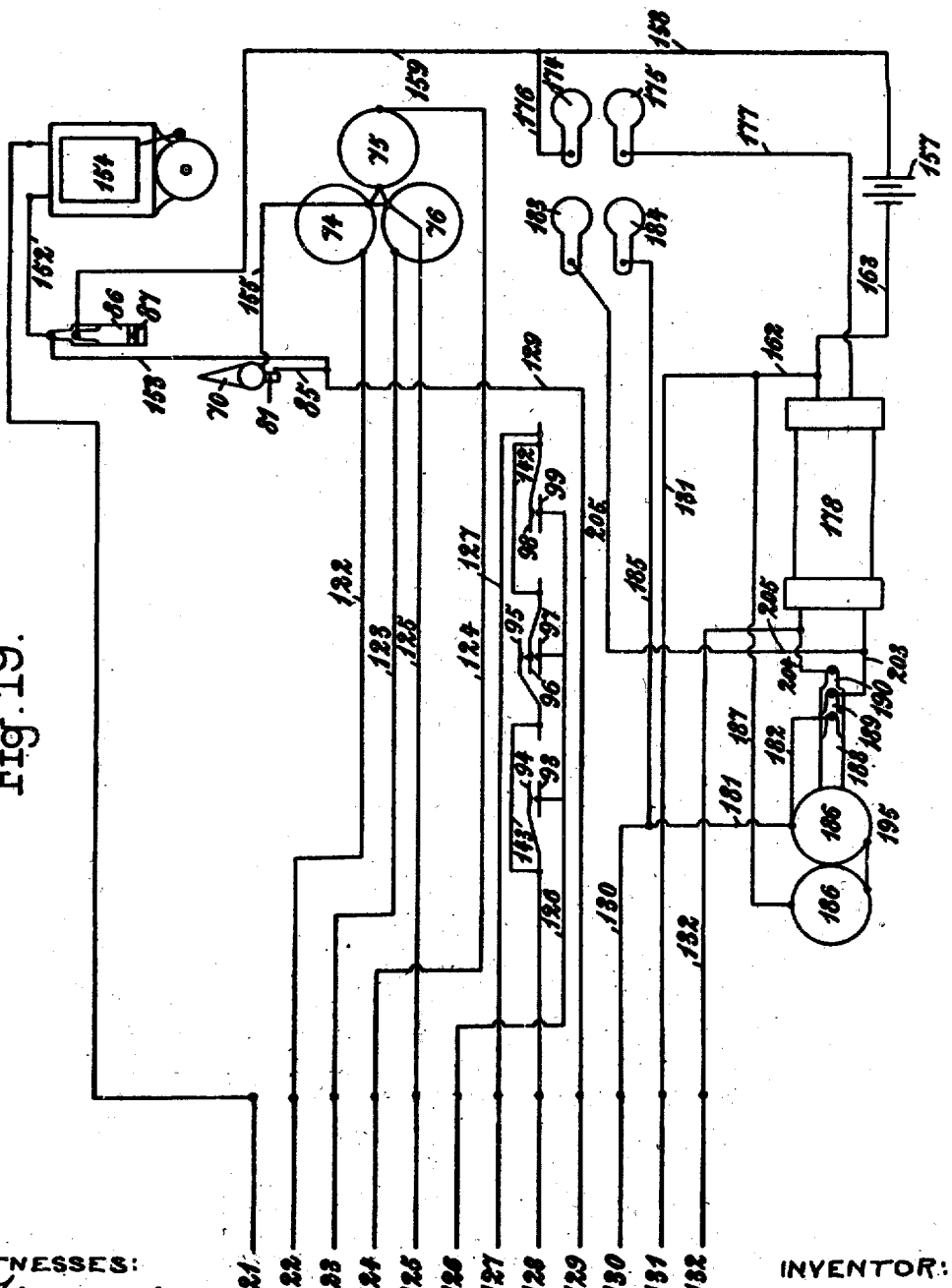

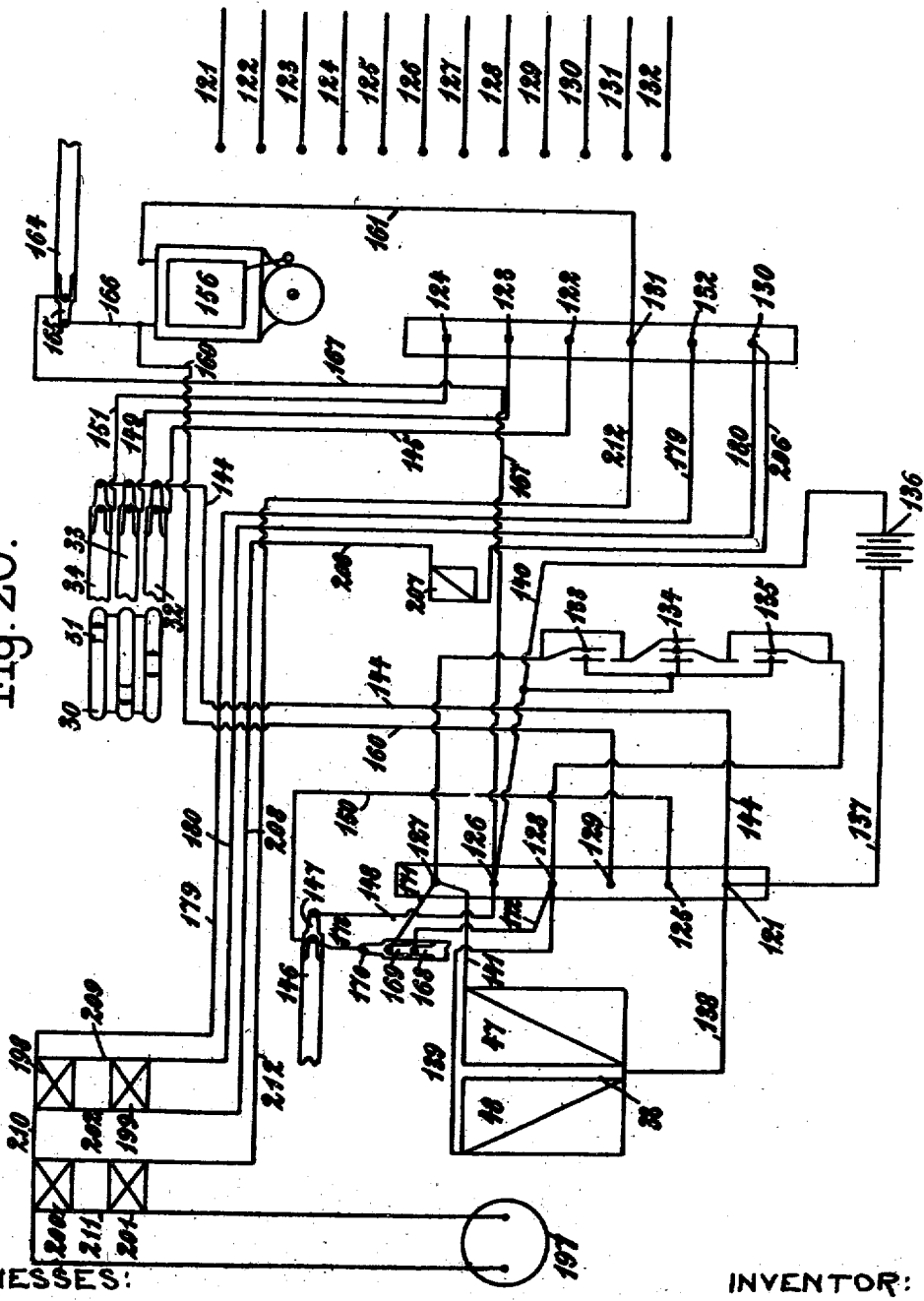

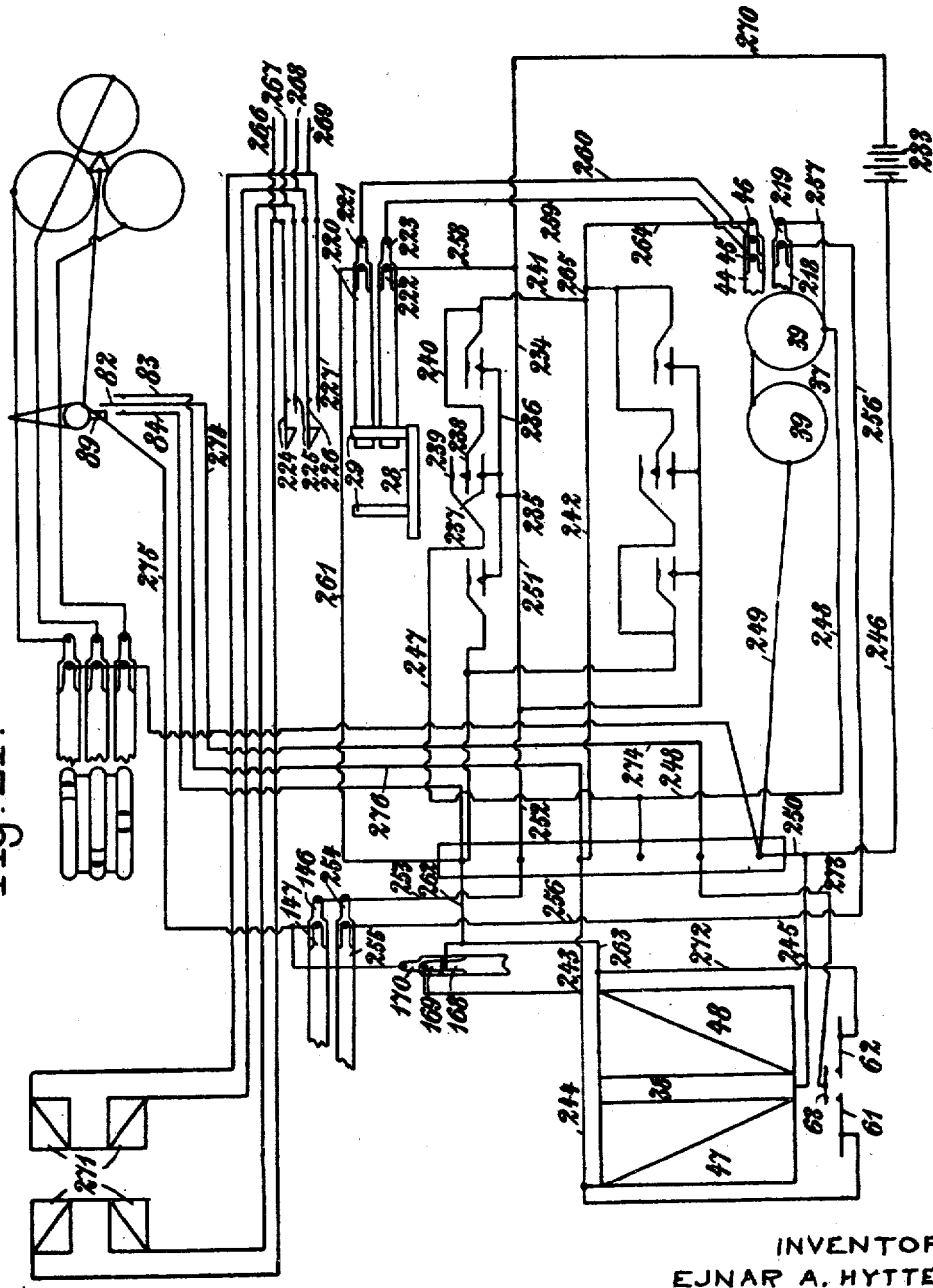

E. A. HYTTEN.
TELEGRAPHONE APPARATUS.
APPLICATION FILED DEC. 31, 1907.

909,414.

Patented Jan. 12, 1909.
14 SHEETS—SHEET 13.

WITNESSES:

INVENTOR:
EJNAR A. HYTTEN.

BY Raushaum + Stockbridge
ATTORNEYS

E. A. HYTTEN.
TELEGRAPHONE APPARATUS.
APPLICATION FILED DEC. 31, 1907.

909,414.

Patented Jan. 12, 1909
14 SHEETS—SHEET 14.

WITNESSES:

INVENTOR:
EJNAR A. HYTTEN,

BY
ATTORNEYS.

UNITED STATES PATENT OFFICE.

EJNAR ALEXANDER HYTTEN, OF COPENHAGEN, DENMARK, ASSIGNOR TO AMERICAN TELEGRAPHONE COMPANY, A CORPORATION OF THE DISTRICT OF COLUMBIA.

TELEGRAPHONE APPARATUS.

No. 909,414.

Specification of Letters Patent.

Patented Jan. 12, 1909.

Application filed December 31, 1907. Serial No. 406,742.

*To all whom it may concern:*

Be it known that I, EJNAR ALEXANDER HYTTEN, a subject of the King of Denmark, residing at Copenhagen, Denmark, have invented certain new and useful Improvements in Telegraphone Apparatus, of which the following is a full, clear, and exact description.

This invention relates to improvements in telegraphone apparatus, which are used as dictating apparatus, and the various parts are arranged in such a manner as to make it possible to record the speech from a telephone apparatus in one place for example, a manager's station on a telegraphone apparatus in another place for example, a stenographer's station. It will thus be possible for the person dictating to control from his seat the advancement, reversal and stopping of the telegraphone apparatus, being able at any time by means of a dial indicator to watch on which part of the wire speech is recorded. He is likewise able to hear from his seat what has been dictated both continuously and in separate parts, and by means of a relay it is possible to bring effacing magnets into and out of action.

The telegraphone apparatus, which will generally be placed in room other than that in which the person dictating has his seat, is provided with removable spools with steel wire, which spools can quickly and easily be exchanged.

The spools removed from this apparatus may be placed on another telegraphone apparatus after having been re-spooled, if necessary, on a special spooling-apparatus, and from this latter telegraphone apparatus, which is provided with push buttons for controlling the dial indicator and telephone, the clerk who is to record the speech may hear the same, either in separate parts or continuously for purpose of comparison.

Without departing from the nature of the invention the said apparatus may of course be somewhat modified. It is for instance possible to speak directly into the apparatus from which the dictation is given out, and the re-spooling on a special apparatus may be replaced by the telegraphone apparatus being itself moved backward, and if desirable dictating may be effected by means of a telephone transmitter arranged on the apparatus itself. The arrangements first mentioned have been proposed with a view to saving time, the arrangement of the special telegraphone apparatus for the dictating and re-spooling apparatus making it possible to effect the dictation and transcription quite independently of each other.

Figure 2:
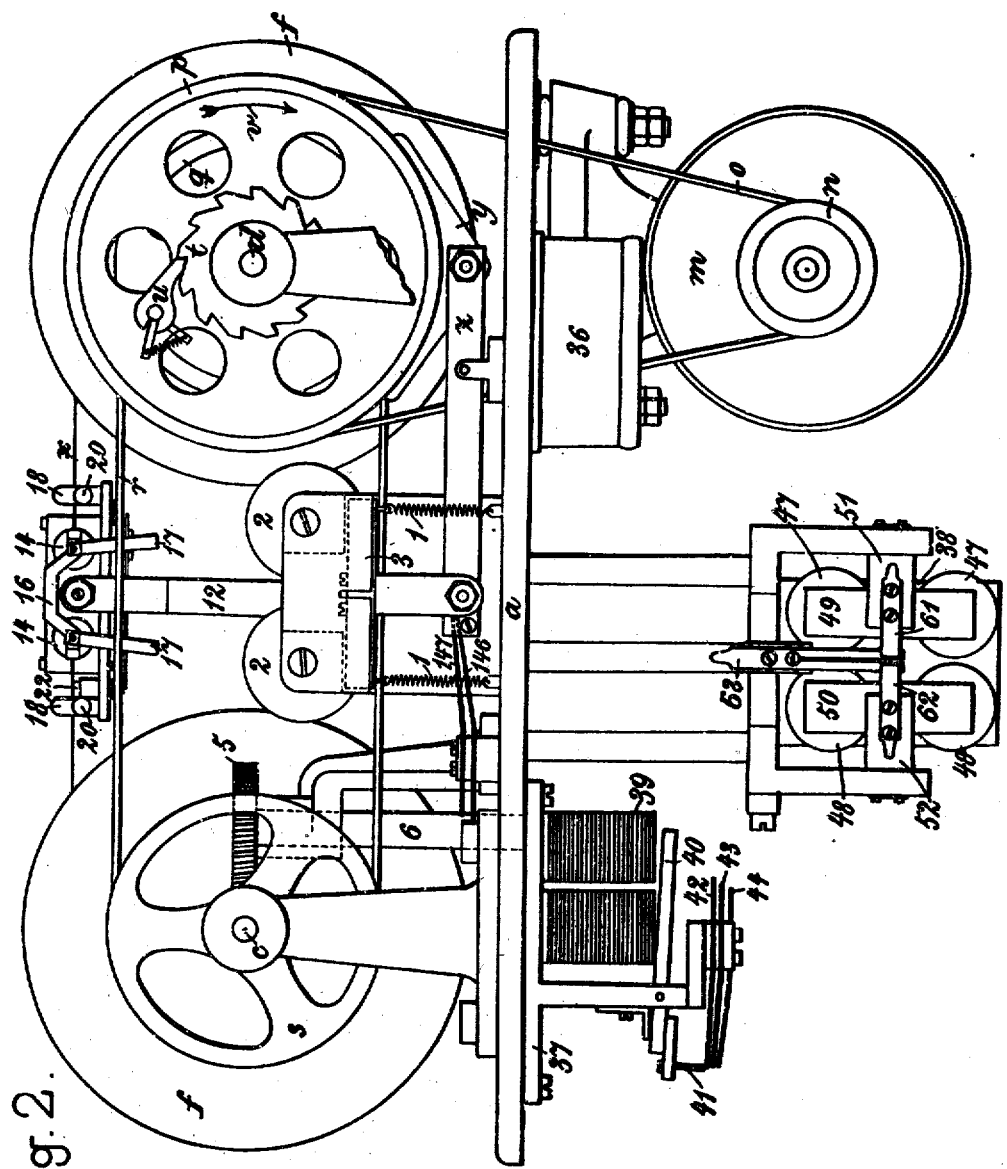
Figure 3:
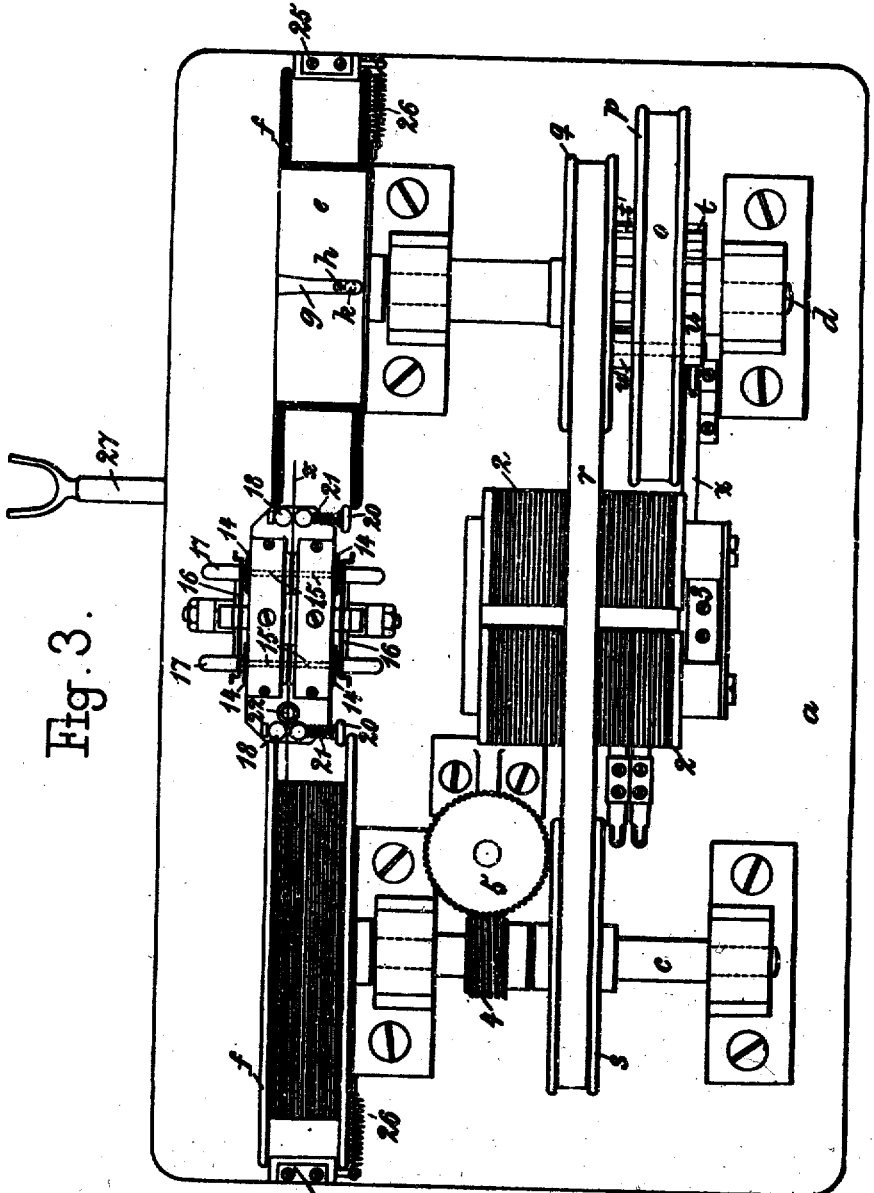
Figure 4:
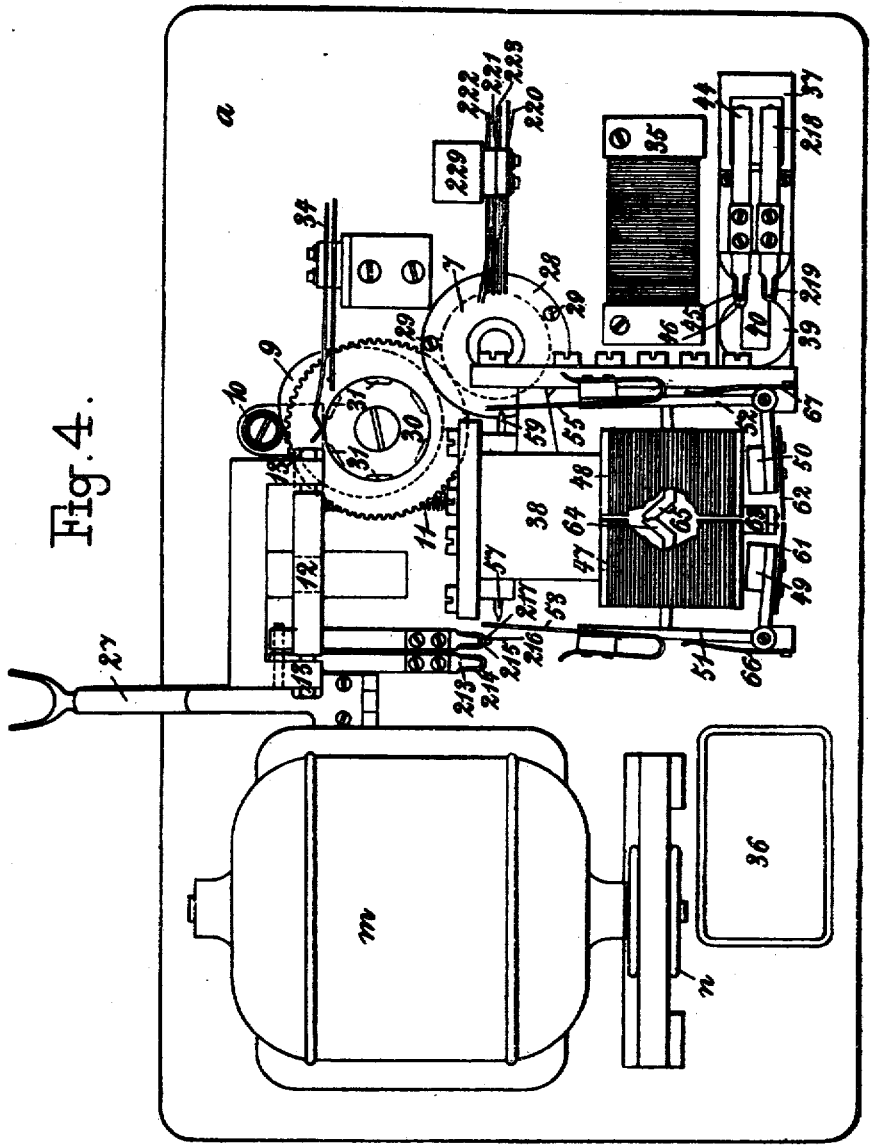
Figure 5:
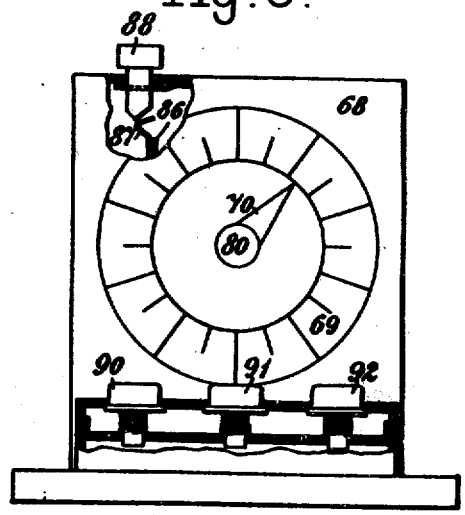
Figure 6:
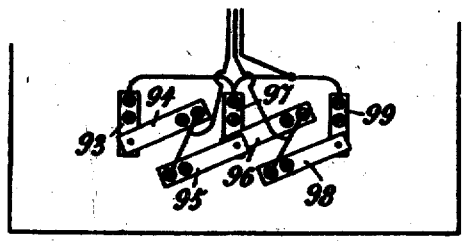
Figures 7, 10:
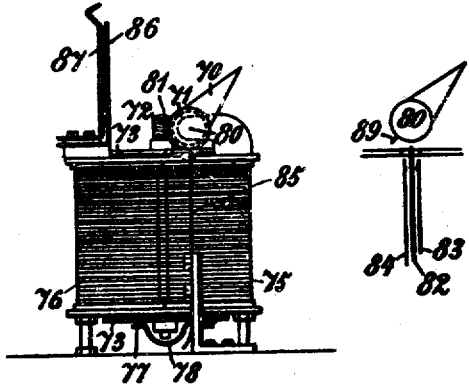
Figures 8, 9:
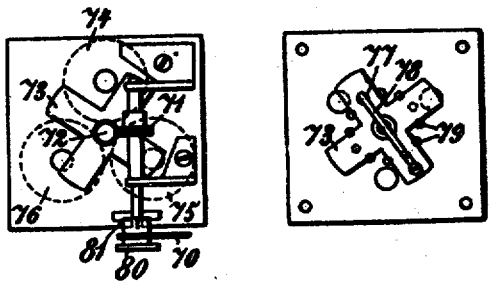
Figure 11:
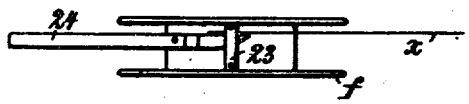
Figure 12:
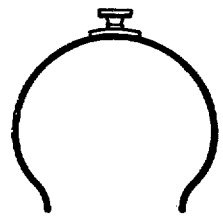
Figure 13:
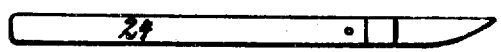
Figure 14:
Figure 22:
Figure 23:
Figure 24:
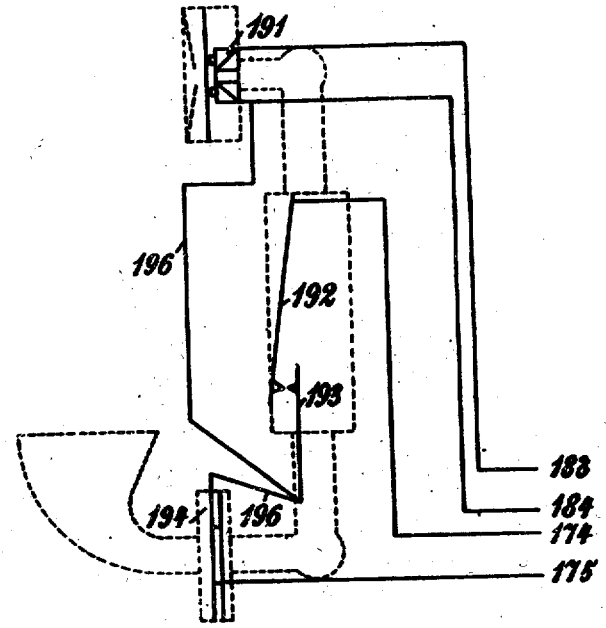

In the drawings Figure 1 shows an elevation of a telegraphone apparatus, the box, in which it is supposed to be placed, being removed; Fig. 2, a rear elevation of the same; Fig. 3, a view from above; Fig. 4, the apparatus seen from below; Fig. 5, the dial indicator with push buttons; Fig. 6 the arrangement of the contact-springs belonging thereto; Fig. 7 an elevation of the dial indicator, the box being removed; Fig. 8 a view of the same from above; Fig. 9 the same seen from below; Fig. 10 some details of a slight modification; Fig. 11 the spool with fastening arrangements for the wire; Fig. 12 a bow for retaining the wire; Figs. 13 and 14 two tools; Fig. 15, a front view of a table with a telegraphone apparatus, a dial indicator and a typewriter; Fig. 16 a side view of the same; Fig. 17 a view of the same from above; Fig. 18 a diagram of the motor circuit; Fig. 19 a diagram of battery- and telephone-circuits for the part of the apparatus from which the dictating takes place; Fig. 20, a diagram of battery- and telephone-circuits in the telegraphone apparatus, which records the speech; Fig. 21, a diagram of battery- and telephone-circuits for the apparatus, which is placed on the table shown in Figs. 15–17, from which the speech is heard. Figs. 22 and 23 show details; Fig. 24, a circuit-diagram of the telephone with line wires belonging thereto; Figs. 25, 26, 27 and 28 show details.

In Figs. 1–4 *a* indicates a base-plate, on which are placed four bearing brackets for the shafts *c* and *d*, both of which on the one end carry cylinders *e*, on which the removable spools *f* are placed. The spools are prevented from turning relative to the cylinders *e*, these latter being provided with grooves *g*, in which are arranged pins *h* (Fig. 3), actuated by springs. The upper end of this pin is hemispherical, so that a projection (indicated by *k*) on the spool may be pushed into the grooves and over the pin *h*, which jumps up again behind the same. In this manner the spools are prevented from being turned and displaced in relation to the cylinders *e*. The electromotor *m*, mounted on the underside of the base-plate $a$, is reversible and carries a pulley $n$, over which passes a belt $o$, which also passes over a loose pulley $p$ on the shaft $d$. The shaft $d$ further carries a loose pulley $q$, which by a belt $r$ is connected with the pulley $s$ on the shaft $c$. When turning in one direction the pulley $p$ is by a ratchet-mechanism connected with the shaft $d$ (Figs. 2 and 3) the ratchet wheel $t$ being fixed on the shaft $d$; on turning the pulley $p$ in the opposite direction it is connected with the pulley $q$ (see Figs. 2 and 3).

The ratchet wheel $t^1$ (Fig. 3) is fixed on the pulley $q$. The pawls $u$ and $u^1$, oppositely disposed, are arranged on the pulley $p$ in such a manner, that one of the pawls when engaging with its ratchet wheel, lifts the other pawl out of engagement with its ratchet wheel, each of the pawls being arranged on one end of a pin, revolubly arranged in the pulley $p$. If the pulley $p$ is turned in the direction indicated by the arrow $v$, Fig. 2, the shaft $d$ is turned with the same, the shaft $c$ being then driven by means of the steel wire $x$. If the pulley $p$ is turned in the opposite direction, it is disconnected from the shaft $d$ and turns the shaft $c$ by means of the belt $r$, the shaft $d$ being then driven by the wire $x$.

Braking of the apparatus when stopping is effected by the brake shoe $y$ on the lever $z$ actuated by the springs 1 being pressed against the pulley $p$. The brake shoe is taken off by the electromagnets 2, (excited by the motor current) attracting the armature 3, which is connected with the lever $z$.

The shaft $c$ carries a worm 4, meshing with the worm wheel 5 on the shaft 6, which under the base-plate $a$ carries the pinion 7, which meshes with a toothed wheel 8, on which the cam disk 9 is arranged. By the spring 11 the roller 10, which is arranged on a bracket projecting from the lever 12, is pressed against the circumference of the cam disk 9, and the lever 12, which at its upper end carries the wire guider, is pivotal on the point screws 13 on a bracket projecting from the base plate $a$. As will be seen from Fig. 1, the axis which joins the pivot points 13 of the lever 12 extends in a direction parallel to the length of the wire $x$.

The thin iron cores 15 in the coils of the electromagnets 14 are connected in pairs by the connecting pieces 16. The iron cores are pressed against the wire $x$ by the bow springs 17. If the wire is to be laid between the cores 15, these are withdrawn a little from each other by the branches of the tool shown in Fig. 14 being pressed down between the pieces 16, thus separating the cores. The wire $x$ is further guided between the four uprights 18 and two horizontal pins 19, which are displaceable and connected with each other. (Figs. 1, 2, 3 and 28). By pushing the buttons 20 both of the pins 19 are displaced, so that the wire $x$ can easily be laid down. On releasing the buttons 20 the wire $x$ will be locked up by the springs 21, as will be clearly understood from Fig. 28. On the wire guider is further arranged an insulating button 22, acted upon by a spring, which button is kept down by the wire $x$, thereby keeping open certain contacts, which are closed when the wire $x$ is run out or broken by an accident. This causes the apparatus to stop in the manner later on described.

In Fig. 11 is shown how the end of the wire $x$ is fastened to the spool $f$. On this latter is arranged a thin plate 23, which is slightly inclined to the bottom of the spool so as to form a narrow wedge-shaped opening, in which the wire can be fastened by means of the knife-shaped tool 24 shown in Fig. 13. When the apparatus runs out, the wire $x$ is drawn out from the fastening, and the end of the rather stiff wire is retained on the filled spool by means of the retainers 25, which by the springs 26 are pressed slightly against the circumference of the filled wire-spool. Before removing the filled spool from the apparatus, the bow shown in Fig. 12 is put over the same so as to retain the wire.

A fork lever 27, of the kind used from the ordinary telephone-apparatus, which in this apparatus serves for hanging up the transmitter, is provided; but this fork lever is only used in the previously mentioned modified arrangement, where the dictating takes place directly to the apparatus itself.

Besides the ear 7 a disk 28 is arranged on the shaft 6 under the base plate $a$, which disk is carried round by friction. Insulating pins 29 arranged on the disk can keep certain contacts closed or open, acting upon the contact springs by the pressure due to the frictional drive, and the movement of the disk 28 is limited by means of the said pins and springs.

An insulating roller 30 provided with three cams is fastened to the gear 8. These cams are in certain places provided with notches 31, Fig. 4. On the circumference of the same three rubbing springs 32, 33 and 34, Fig. 1, which sliding down into the notches 31 close contacts with the contact springs, which serve for working the dial-indicator or indicators in the manner later on described.

In Fig. 4 is further shown the transformers 35 for the telephone current, the safety fuse 36 for the motor current, a relay 37 for the backward movement used at the giving out, and finally the principal controlling relay 38 for the motor current. The relay 37 is provided with an electro-magnet 39, Figs. 2 and 4, which can attract a pivoted armature 40 carrying two insulating screws, one of which 41, Fig. 2, can close contact between the springs 42 and 43, the other one can close two contacts, viz: between the springs 44 and 45 as also between 45 and 46 (Fig. 4). The principal controlling relay 38 is provided with two sets of electro magnets 47 and 48 with armatures 49 and 50 on the short arms of the elbow levers 51 and 52, the long arms of which carry contact springs 53, 54, 55 and 56 for the motor current, which springs can close contact with the contact screws 57, 58, 59 and 60, Figs. 1 and 4. The short arms of the elbow levers 51 and 52 further carry contact springs 61 and 62, which can close contact with the fork-shaped contact spring 63. From each of the long arms of the elbow levers 51 and 52 projects an arm, respectively 64 and 65, the ends of which are step-shaped as shown in Fig. 4, (where part of the electro magnets is broken away in order to show this). The arms 64 and 65 are pressed against each other by the springs 66 and 67 acting upon the levers 51 and 52 respectively, and the said arms can besides the position shown in Fig. 4 assume the positions shown in Figs. 22 and 23. If the various parts assume the position shown in Fig. 4 and the armature 49 is attracted by the magnet 47, the arms 64 and 65 will assume the position shown in Fig. 22, when contact is closed between the springs 55 and 56 and the contact-screws 59 and 60 respectively, as also between the springs 61 and 63. If the armature 50 be attracted the parts will assume the position shown in Fig. 23, and the just named contacts will be interrupted, while the springs 53 and 54 will make contact with the screws 57 and 58 respectively and at the same time contact is closed between the springs 62 and 63. If both armatures 49 and 50 be attracted and then simultaneously released, the various parts will reassume the position shown in Fig. 4, in which all the above named contacts are interrupted.

The dial-indicator comprises a case 68 carrying a dial 69, over which a hand 70 is moved. The shaft of the hand carries a worm gear 71, Figs. 7 and 8, meshing with the worm wheel 72, the shaft of which carries two cross-shaped armatures 73 arranged with parallel branches. Between the armatures are placed three electro-magnets 74, 75 and 76, which being excited in succession turn the worm wheel 72, the same being at each excitation of one of the electro-magnets turned 1/12 of a revolution. The worm is retained in its twelve positions by a small ball 77 arranged in a hole in the undermost armature 73 and acted upon by a spring 78, which ball can be pressed down into any one of the 12 small cavities 79. The hand 70 is frictionally mounted on the shaft so as to make it possible to turn the same into any position wanted by means of the button 80. On the nave of the hand is further arranged a pin 81, Fig. 7, or 89, Fig. 10, which latter, when the hand is pointing to zero, makes contact with the spring 82, which again makes contact with the spring 83, if the hand is turned in one direction, but with the spring 84 if the hand is turned in the other direction. In the arrangement shown in Fig. 7 there is only one single spring 85, causing a bell to sound when the hand is approaching zero, this apparatus being placed near the seat of the person dictating in order to warn him when the wire is about to run out. On this apparatus are further arranged the contact springs 86 and 87, and by pushing the button 88, Fig. 5, a bell signal is given to the person attending to the telegraphone apparatus calling his attention to the fact that the spool is to be exchanged. At the telegraphone apparatus itself, from which the dictation is given out, is arranged a similar apparatus, but without the contact springs 86 and 87 and with the arrangement of the contact springs 82, 83 and 84, shown in Fig. 10, causing the apparatus to stop automatically, when the hand is pointing to zero. The latter apparatus is also provided with three push buttons 90, 91, and 92. Pushing the button 90 causes contact to be made between the springs 93 and 94, Fig. 6, effecting the starting of the apparatus in the forward direction. Pushing the button 91 causes contact to be made between the springs 95 and 96, then between these and the spring 97, causing the apparatus to stop, and finally pushing the button 92 causes contact to be made between the springs 98 and 99, effecting the starting of the apparatus in the reverse direction.

In Figs. 15–17, which show a table on which is mounted the telegraphone apparatus, 100, from which dictation takes place, is further shown the dial-indicator 101, arranged as in Fig. 10. 102 indicates a typewriter, near which are arranged push buttons 103, 104 and 105, as also 106, 107 and 108 from which the telegraphone apparatus can be controlled in a similar manner as in the arrangements shown in Figs. 5 and 6, so as to enable the person, who has to transcribe the matter dictated, to hear the speech in parts. For sake of convenience the upper part of the table is arranged on a central pivot, so as to enable the person, who has to attend to the telegraphone apparatus as well as the typewriter, to bring either of the two apparatus in front of him. Besides or instead of the said push-buttons corresponding contacts may be arranged on the floor, which contacts may be actuated by the feet so as to avoid removing the hands from the typewriter.

The working of the different apparatus and the different circuits will be understood from the diagrams shown in Figs. 18, 19, 20, 21 and 24. Fig. 18 shows the diagram of the motor-circuit. 109 and 110 indicate the connection to a suitable source of current. The current flows from the contact 109 through the wire 111 and the field coils 112 of the motor, through the wire 113 to the contact-screw 60 on the relay 38 (Figs. 1, 2 and 4) through the wire 114 to the contact screw 57, through the contact-spring 53, wires 115 and 116 and the armature windings of the motor, through wire 117 to the contact-spring 54, through the contact-screw 58 and wire 118, through the electro-magnets 2 of the brake apparatus, through the wire 119 to the contact 110, including at some point the safety-fuse 36, Figs. 2 and 4. With the connections as above described the brake is held out of action, and the motor runs in the direction, which has been denoted the forward direction. For running in the reverse direction the circuit is as follows:—from the contact 109 through the wire 111 and the field coils 112 of the motor through the wire 113 to the contact screw 60, contact spring 56, wire 117, the armature windings of the motor, wire 116, contact-springs 55, contact-screw 59, wire 120 to the contact-screw 58, wire 118, electro-magnets 2 and wire 119 to contact 110. In the position of the contacts of the relay 38 shown in Fig. 18, the current has been broken by the relay and the apparatus is stopped. In Figs. 19 and 20 are shown the circuits, by which the said relay 38 is controlled by means of the push-buttons and the dial indicator, as also the circuits by means of which the dial indicator is worked, in connection with the apparatus on which the speech is recorded. The wires 121—132 shown in Fig. 19 are continued in Fig. 20, and must here be imagined connected with the terminals, marked with the same numbers by means of wires, which for sake of clearness have been omitted in the drawings. In Fig. 20, 133, 134, and 135 indicate three sets of contact-springs, arranged in parallel with those belonging to the push button 90, 91 and 92, Fig. 5 and shown in Fig. 6, it being convenient to be able to control the apparatus also at the very place where it is situated. The battery for the relay and the dial indicator is indicated by 136, Fig. 20. If the apparatus is to be started in the forward direction, contact between the springs 93 and 94 is made by pushing the button 90. The current then flows from the battery 136 through the wires 137 and 138, the electro-magnet 48 of the relay 38, the wires 139 and 128 to the contact-spring 94, contact-spring 93 through the wires 126 and 140 back to the battery. The relay 38 will then direct the current to the motor as previously named through the contacts 53, 57 and 54, 58 (Fig. 18). If the apparatus is to be stopped, the button 91 is pushed, causing a circuit to be made as follows:—from the battery 136 through the wires 137 and 138; here the current is divided into two branches, viz: one through the electro-magnet 47, wires 141, 127 and 142 to the contact-spring 96; here it rejoins the other branch from the wire 138, the electro-magnet 48, wires 139, 128 and 143, the contact-spring 95; herefrom the rejoined currents flow through the contact-spring 97, the wires 126 and 140 back to the battery 136, whereby both armatures 49 and 50, of the relay 38 are attracted, and the motor-circuit is broken as previously explained. If the button 91 is released, the circuits are broken, but owing to the arms 64 and 65 the relay 38 will assume the position shown in Fig. 4, and the motor-circuit remains interrupted. If the apparatus is to be run in the reverse direction, the button 92 is pushed, causing the following circuit to be made:—from the battery 136 through the wires 137 and 138, the electro-magnet 47, wires 141 and 127, the contact-springs 98 and 99, Fig. 19, through the wires 126 and 140, Fig. 20, back to the battery 136. Hereby the armature 49 of the relay 38 is attracted and the motor circuit is closed through the contacts 55, 59 and 56, 60, Fig. 18, causing the wire x to run in the reverse direction. The stopping is effected, as mentioned above, by pushing the button 91.

The dial indicator shown in Fig. 5 is brought into operation in the following manner:—Owing to the rotation of the roller 30 (Figs. 1, 4 and 20) during the working of the apparatus, the rubbing-springs 32, 33 and 34 will at regular intervals slide down into the notches 31 in the cams on the roller 30, making contact with the springs arranged opposite to the same, all of which springs are connected to each other, as shown in Fig. 20. It must further be observed that the circuits thus closed have to pass a contact between the springs 146 and 147, Figs. 2 and 20, kept closed by the brake lever z, when the brake is taken off, i. e. when the apparatus is running; by this means it is rendered impossible for the battery circuit to remain closed through one of the electro-magnets of the dial indicator when the apparatus is at rest. The currents working the dial indicator, have the following course:—Suppose the rubbing spring 34 has closed contact with its contact-spring, the following circuit is closed:—from the battery 136 through the wires 137 and 144, the contact-springs 34, wires 151 and 124, the electro-magnet 75, Fig. 19, the wires 125 and 150, Fig. 20, the contact-springs 146 and 147, the wires 148 and 140 back to the battery 136. If the rubbing spring 33 make contact, a current from the battery 136 flows through the wires 137 and 144, the rubbing spring 33, the wires 149 and 123, the electro-magnet 76, Fig. 19, wires 125 and 150 (Fig. 20), the contact-springs 146 and 147, wires 148 and 13

140 and back to the battery 136. Finally if the rubbing spring 32 make contact, a current from the battery 136 flows through the wires 137 and 144, the rubbing spring 32, wires 145 and 122, the electro-magnet 74 (Fig. 19) wires 125 and 150 (Fig. 20) contact-springs 146 and 147, wires 148 and 140 back to the battery 136. In this manner the electro-magnets of the dial indicator are successively excited, and the hand is set going in the manner previously described. When the hand 70 (Figs. 5, 7 and 19) has made one revolution, the wire x is about to run out, and the pin 81 then causes a circuit to be closed through the bell 154, which is situated near the dial indicator. This circuit flows from the battery 136 (Fig. 20) through the wires 137 and 121, the bell 154 (Fig. 19) wires 152 and 153, contact-spring 85, the pin 81, wires 155, 125 and 150 (Fig. 20) contact-springs 146 and 147, wires 148 and 140 back to the battery 136. The sounding of the bell continues until the contact between the contact-springs 146 and 147 is interrupted by stopping the apparatus, for instance by pushing the button 91. The person dictating can now by pushing the button 88, Fig. 5, give a bell signal to the person attending to the apparatus, by actuating a bell 156 (Fig. 20) which is placed at the apparatus. This signal current flows from the battery 157 (Fig. 19), through the wires 158 and 159, the contact-springs 86 and 87, wires 153, 129 and 160 (Fig. 20), through the bell 156, wires 161, 131 (Fig. 19), 162 and 163 back to the battery 157. The person attending to the apparatus can by means of his push button, which actuates the contact-spring 135 (Fig. 20) cause the apparatus to run out and then exchange the spool. After having exchanged the spool a bell-signal can be given by means of the bell 154 on the dial indicator (Fig. 19) by pushing a button causing two contact-springs 164 and 165 (Fig. 20) to make contact, giving notice that the dictating can be continued. The said signal-current flows from the battery 136 through the wires 137 and 121 (Fig. 19) the bell 154, wires 152, 153, 129, 160 (Fig. 20) and 166, the contact-springs 165 and 164, the wires 167 and 140 back to the battery 136.

There further remains to be mentioned the device for causing the apparatus to stop, when the same is to run completely out, as above mentioned, when a spool is to be exchanged, which device will likewise act if the wire x is accidentally broken. The button 22, Figs. 1, 2 and 3, arranged on the wire guider, is kept down by the tightened wire x causing contacts to be kept open between the contact-springs 168 and 169, and between 169 and 170. If the wire runs out or breaks these contacts are closed, causing the apparatus to stop. In such a case a current flows from the battery 136 (Fig. 20) through the wires 137 and 138, where the current divides into two branches, one of which flows through the electro-magnet 47, the wires 141 and 171 to the contact-spring 169, where it rejoins the other branch, flowing through the electro-magnet 48, wires 139 and 172 to the contact-spring 168; from here the rejoined branches flow through the contact-spring 170, the wire 173, the contact-springs 146 and 147, wires 148 and 140 back to the battery 136. This circuit is interrupted between the contact-springs 146 and 147 by the stoppage of the apparatus, as above described, and the apparatus cannot be started again, until the button 22, Figs. 1-3, is again depressed.

In Fig. 24 is diagrammatically shown the telephone used for dictating. This is of the ordinary type with a contact-spring 192 which can be actuated by the fingers. Each of the wires numbered 174, 175, 183 and 184 must be imagined connected to the binding screws indicated by the corresponding numbers in Fig. 19. A special relay 195, Fig. 19, can be actuated by pressing the spring 192. When the armature of the said relay is attracted, contact is made between the contact-springs 188 and 189; when it falls back, this contact is interrupted and contact is made between the springs 189 and 190, which latter contact is again interrupted when the armature is attracted. The function of this relay is either to short circuit the secondary coil of the transformer 178 or the telephone receiver magnet 191, Fig. 24.

The circuits of the transmitter and the receiver of the telephone are as follows: The primary current of the transmitter circuit flows from the battery 157, (Fig. 19) through the wires 158, 176 and 174 (Fig. 24), the contact-springs 192 and 193 (contact between same being kept closed while speaking), the wire 196, the transmitter 194, wires 175 and 177, (Fig. 19) the primary coil of the transformer 178, through the wire 163 back to the battery 157. The depression of the spring 192 (Fig. 24) effects the closing of a circuit through the relay 195, (Fig. 19), whereby contact is made between the springs 188 and 189, as above mentioned. This circuit passes from the battery 157, through wires 158, 176 and 174 (Fig. 24), the contact-springs 192 and 193, wires 196, 184, 185 (Fig. 19) and 181, the electro-magnet 186, wires 187, 162 and 163 back to the battery 157.

The magnets 14 shown in Figs. 1, 2 and 3 will in the following be denominated as effacing- and speaking-magnets, each of which is in this apparatus provided with two windings. If speech is to be effaced without the apparatus carrying out any other function, a current is led through one winding on each of the 4 magnets. If speech is to be effaced at same time as new speech is recorded, one winding of each of the magnets first passed by the wire $x$ while advancing, is used for the effacing. The effacing-current is then led through the one winding of each of the other two magnets, whereby the wire is magnetically polarized; the other two windings on the latter magnets are used for recording the speech. The other winding on the former magnets is always connected with a telephone receiver 197 (Fig. 20), by which the person attending to the apparatus is enabled to hear what is spoken to the telephone shown in Fig. 24. In Fig. 20 the speaking-magnets are indicated by 198 and 199, and the effacing-magnets by 200 and 201. The secondary speaking-current flows from the secondary winding of the transformer 178 (Fig. 19) through the wires 132 and 179 (Fig. 20), the speaking-magnet 198, the wire 202, the speaking-magnet 199, wires 180, 130 (Fig. 19), 181 and 182, the contact-springs 188 and 189, the wire 203 back to the transformer 178. If the person dictating wants to hear the speech or part of the same, the apparatus is reversed by means of the push-button 92 (Fig. 5), as previously described, and when the apparatus after having run backwards a distance (the length of which can be observed on the dial-indicator), is again run in the forward direction by pushing the button 90, the contact between the springs 192 and 193 (Fig. 24) being interrupted, the speech can be heard in the receiver. The circuit of the telegraphone-current is then as follows:—From the speaking-magnet 198 (Fig. 20), through the wires 179, 132 (Fig. 19), and 204, the contact-springs 190 and 189, the wires 203, 205 and 183 (Fig. 24), the receiver-magnet 191, the wires 184, 185 (Fig. 19), 130 and 180 (Fig. 20), the speaking-magnet 199, the wire 202 back to the speaking-magnet 198.

Finally the effacing-circuit is to be described. The same is closed by pressing down the contact-spring 192, Fig. 24. The current then flows from the battery 157 (Fig. 19), the wires 158, 176 and 174 (Fig. 24), the contact springs 192, 193, the wires 196, 184, 185 (Figs. 19, 130, 206 (Fig. 20), a resistance 207 for adjusting the intensity of the current, the wire 208, the one winding of the magnet 199, the wire 209, the one winding of the magnet 198, the wire 210, the effacing-magnet 200, the wire 211, the effacing-magnet 201, the wires 212, 131 (Fig. 19), 162 and 163 back to the battery 157. The telephone receiver 197 (Fig. 20) is only connected with one winding on each of the magnets 200 and 201 (Fig. 20).

The fork-lever 27 shown in Figs. 1, 3 and 4 serves for hanging up a transmitter in case it is wanted to dictate to the apparatus from the place, where it is situated, instead of from the other place, as previously mentioned. In this case the fork-lever serves for making and breaking contact between two sets of contact-springs 213, 214, 215, 216 and 217 (Fig. 4), the former pair of which perform exactly the same functions as the contact-springs 192 and 193 (Fig. 24) and the three latter perform exactly the same functions as the contact-springs 190, 189 and 188, respectively (Fig. 19).

The spools which are taken off the apparatus may be re-spooled, if desired, on a special suitable re-spooling-apparatus, and are then mounted on the apparatus 100 on the table shown in Figs. 15–17, which apparatus is essentially constructed like the apparatus just described, the circuit-diagrams being different in some respects owing to the apparatus only being used for receiving purposes. After each stopping of the apparatus a backward movement takes place for some seconds, the receiver is short-circuited during the backward movement, and finally an automatic stopping of the apparatus is effected by the dial-indicator.

Fig. 21 shows the diagram of the relay- and speaking- circuits of this apparatus. The motor-current-diagram is identical with that shown in Fig. 18.

The dial-indicator 101 shown in Figs. 15–17 is essentially similar to the one previously described with the exception that the bells and thereto belonging push-buttons are not found here; the hand with the pin 89 actuates the set of contact-springs shown in Fig. 10. The diagram of the battery-circuit driving the dial-indicator is exactly like the one previously described. As the person, who is to hear and transcribe the speech, generally uses a head-receiver in order to have both hands free, it is essential that the speaking-current or the telephone be short-circuited during the backward movement, as the unintelligible sounds would disturb him. The device shown in Figs. 25–27 serves for accomplishing this.

Figure 25:
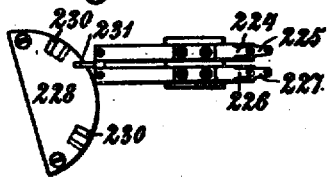
Figure 26:
Figure 27:
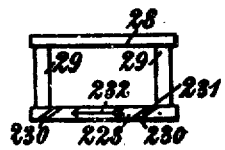
Figure 28:

On the pins 29 shown in Fig. 4 on the disk 28 is mounted an ebonite-plate 228, the edge of which is provided with the two oblique notches 230, (Figs. 25 and 27). On the upright 229 (Fig. 4) are mounted four contact-springs 224, 226, 225 and 227, Figs. 25 and 26, (for sake of clearness the plate 228 and the said four contact-springs have been omitted in Fig. 4). The contact-springs 224 and 226 are connected to each other by an ebonite-piece carrying a pin 231. This pin may be either above or under the edge of the plate 228, as it can pass the oblique notches 230, as shown in Fig. 27. If the plate 228 is rotated in the direction indicated by the arrow 232, the pin 231 slides up through one of the notches 230 on the upper side of the plate, causing the springs 224 and 226 to make contact with the springs 225 and 227 respectively, whereby the telephone-receiver is short-circuited. When the plate 228 has moved so far, that the pin 231 has passed the other notch 230, and the plate 228 is now rotated in the opposite direction, the pin 231 slides down on the underside of the same, and the said contacts are broken.

As the speech is to be heard in shorter periods, for instance, sentence by sentence, the apparatus must be stopped after each sentence while the transcription takes place and as it is desirable when re-starting the apparatus to be able to hear the last part of the preceding sentence, this apparatus has been constructed in such a manner, that by pushing a button the apparatus is reversed during a few seconds before stopping. The circuit-diagram for effecting this backward movement is shown in Fig. 21. In this apparatus the brake-lever z actuates, besides the contact-springs 146 and 147, Fig. 2, another pair of springs 254 and 255, Fig. 21. If the apparatus is running in the forward direction during the giving out of the dictation through two telephones connected with the wires 266, 267 and 268, 269, and if it is to be stopped, contact is made between the springs 237, 238 and 239 by pushing a button. Hereby two circuits are closed, one through the relay 37, Fig. 21, the other through the electro-magnet 47 of the relay 38, causing the motor to be reversed so that the apparatus runs backward, and it continues to do so until one of the pins 29 on the disk 28 has made contact between the springs 220 and 221 and between the springs 222 and 223. Both electro-magnets 47 and 48 are hereby excited and the motor stopped. The relay 37 in attracting its armature, closes a circuit through its own electro-magnet 39, which circuit also includes the springs 254 and 255 and 218 and 219. In stopping the motor the brake-device causes this circuit to be broken, and the various parts to re-assume the position shown in Fig. 2.

The above circuits are as follows:—The current passing through the relay 37 flows from the battery 233 through the wires 246, 250 and 249, the electro-magnet 39, wires 248 and 247, the contact-springs 239, 238 and 237, wires 236, 235, 234 and 270 back to the battery. The circuit closed by the relay 37 through its own electro-magnet, flows from the battery 233 through the wires 246, 250 and 249, the electro-magnet 39, wire 257, contact-springs 219 and 218, wire 256, contact-springs 255 and 254, wires 253, 252, 251, 234 and 270 back to the battery 233. The current through the electro-magnet 47 flows from the battery 233 through the wires 246 and 245, electro-magnet 47, the wires 244, 243, 242, 241 and 240, contact-springs 238 and 237, the wires 236, 235, 234 and 270 back to the battery 233. The circuits closed by the contact-springs 220 and 221, and 222 and 223 through the electro-magnets 47 and 48 are as follows:—from the battery 233 through the wires 246 and 245, where the current divides into two branches, one of which flows through the electro-magnet 47, through the wires 244, 243, 242, 265 and 264, the contact-spring 46; here it re-joins the other branch flowing through the electro-magnet 48, the wires 263, 262 and 261, the contact-springs 220 and 221, the wire 260 the contact-spring 45; the re-joined currents then flow through the contact-spring 44, the wire 259, the contact-springs 223 and 222, the wires 258 and 270 back to the battery 233.

The automatic stoppage of the apparatus caused by the dial-indicator, is effected in the following manner:—When the apparatus is running in the forward direction, the armature of the electro-magnet 48 will be attracted or retained by the arms 64 and 65 (Fig. 4). Contact between the springs 62 and 63 is then made. When the pin 89 (Fig. 21) on the dial-indicator touches the contact-spring 82, a current will be led through the electro-magnet 48, which current will have no effect, the armature having beforehand assumed the attracted position. When the contact-spring 82 now touches the contact-spring 83 a current is led through the electro-magnet 47, causing the apparatus to stop. The said currents are interrupted by the stoppage of the apparatus by means of the contact-springs 146 and 147, actuated by the brake-device. The former current through the electro-magnet 48 flows from the battery 233 through the wires 246 and 245, the electromagnet 48, the wire 272, the contact-springs 62 and 63 the wires 273 and 274, the contact-spring 82, the pin 89, the wire 275, the contact-springs 147 and 146, the wires 253, 252, 251, 234, and 270 back to the battery 233. The latter current through the electro-magnet 47 flows through the battery 233 through the wires 246 and 245, the electro-magnet 47, the wires 244, 243, and 276, the contact-springs 83 and 82, the pin 89, the wire 275, the contact-springs 147 and 146, the wires 253, 252, 251, 234 and 270 back to the battery 233. When the apparatus is running backward the pin 89 will at length make contact with the spring 82, which then makes contact with the spring 84, the hand being turned in a direction opposite to the previous one, and circuits will be closed through the electromagnets 47 and 48 in a manner, which is analogous to the manner above described, with the only difference that the magnets 48 and 47 and the contact-springs 61 and 62 are interchanged.

The contact-springs 224—227 shown in

Figs. 25 and 26, which in the manner previously described effect short-circuiting of the telephones or speaking-magnets, are also shown in Fig. 21, the speaking-magnets being here indicated by 271.

Of course all the different dictating and hearing-apparatus may, if desired, be provided with additional push-buttons, transmitters, receivers, automatic reversing devices and the like, without departing from the spirit of the invention.

Having thus described my invention, I claim as new and desire to secure by Letters Patent.

1. In a telegraphone, a power shaft, a pair of freely revoluble spools, a wire passing between said spools, a telegraphone magnet, and separate clutches for engaging said respective spools in driven relation from said shaft, said clutches being automatically engaged respectively by movements of said shaft in opposite directions.

2. In a telegraphone, a pair of spools, a wire passing between said spools, a telegraphone magnet, and spring impelled retainers engaging the peripheries of said spools and adapted to retain the wire thereon when fully wound.

3. In a telegraphone, a continuously movable wire, a pair of magnets having longitudinally movable cores engaging said wire, and separate springs for impelling said cores to engage the wire.

4. In a telegraphone, a continuously movable wire, a pair of magnets having movable cores engaging said wire, means connecting said cores together, and springs for impelling said cores into engagement with said wire.

5. In a telegraphone, a continuously movable wire, a telegraphone magnet, a pair of horizontally disposed pins between which the wire passes, and means for longitudinally displacing said pins, whereby the wire is released from their engagement.

6. In a telegraphone, a continuously movable wire, a telegraphone magnet, a pair of vertically disposed guides between which the wire passes, pins slidably movable through said guides in a horizontal direction and between which the wire passes, means for connecting said pins whereby they move together, and a push button for depressing said pins transversely through said guides whereby the wire is released from their engagement.

7. In a telegraphone, a pair of spools, a wire movable therebetween, an arm swinging on an axis parallel with said wire, and a telegraphone magnet carried by said arm.

8. In a telegraphone, a movable wire, an arm swinging on an axis parallel with said wire, a telegraphone magnet carried by said arm, and a cam for controlling said arm.

9. In a telegraphone apparatus, a manager's station having a telephone set, a stenographer's station having a telegraphone, indicating means at the manager's station for showing the condition of the telegraphone, and controlling means at the manager's station for starting, stopping and reversing the same.

10. In a telegraphone apparatus, a manager's station having a telephone set, a stenographer's station having a telegraphone, indicating means at the manager's station for showing the movement of the record medium of the telegraphone, and means automatically actuated by said indicating means for signaling the stenographer's station at the completion of a predetermined movement of said record medium.

11. In a telegraphone apparatus, a manager's station having a telephone set, a stenographer's station having a telegraphone, means for starting, stopping and reversing the telegraphone, a three-wire circuit for controlling said means, and duplicate circuit controllers at the manager's station and at the stenographer's station for connecting different branches of said three-wire circuit whereby said means is controlled.

12. In a telegraphone apparatus, a manager's station having a telephone set, a stenographer's station having a telegraphone, means for starting, stopping and reversing the telegraphone, a circuit for controlling said means, and duplicate circuit controllers at the manager's station and at the stenographer's station for closing said circuit in a plurality of different ways whereby said means is controlled.

13. In a telegraphone apparatus, a manager's station having a telephone set, a stenographer's station having a telegraphone, means for starting, stopping and reversing said telegraphone, and a circuit including three wires for controlling said means, and circuit controllers at separate points for connecting different of said wires together, whereby the telegraphone is started, stopped and reversed.

14. In a telegraphone apparatus, a manager's station having a telephone set, a stenographer's station having a telegraphone, indicating means at the manager's station and at the stenographer's station for showing the movement of the telegraphone record medium, a signaling circuit, means for transmitting a signal over said circuit from the manager's station to the stenographer's station at the completion of a predetermined movement of said record medium, and separate means for establishing a signal from the manager's station over said circuit, whenever desired.

15. A telegraphone, means for starting, stopping and reversing said telegraphone, and a circuit including three wires for controlling said means, said means operating to stop the telegraphone when one of said wires is connected to both of the other two, and operating to start or reverse the telegraphone when said wire is connected to either of the other two circuit wires separately, and circuit closing devices at points in said three wire circuit for connecting said wires in the said manners, as desired.

16. A telegraphone, means for starting, stopping and reversing said telegraphone, and a circuit including three wires for controlling said means, said means operating to stop the telegraphone when one of said wires is connected to both of the other two, and operating to start or reverse the telegraphone when said wire is connected to either of the other two circuit wires separately, and circuit closing devices at a plurality of separate points in said three wire circuit for connecting said wires in the said manners, as desired.

17. In a telegraphone apparatus, a manager's station having a telephone set, a stenographer's station having a telegraphone, means for starting, stopping and reversing said telegraphone, and a circuit including three wires for controlling said means, said means operating to stop the telegraphone when one of said wires is connected to both of the other two, and operating to start or reverse the telegraphone when said wire is connected to either of the other two circuit wires separately, circuit closing devices in said three wire circuits for connecting said wires in the said manners, as desired, and means at the stenographer's station and at the manager's station for indicating the movement of the telegraphone record medium.

18. In a telegraphone apparatus, a manager's station having a telephone set, a stenographer's station having a telegraphone, means for starting, stopping and reversing said telegraphone, and a circuit including three wires for controlling said means, said means operating to stop the telegraphone when one of said wires is connected to both of the other two, and operating to start or reverse the telegraphone when said wire is connected to either of the other two circuit wires separately, circuit closing devices in said three wire circuits for connecting said wires in the said manners, as desired, means at the stenographer's station and at the manager's station for indicating the movement of the telegraphone record medium, and means for signaling from the manager's station to the stenographer's station and from the stenographer's station to the manager's station.

19. In a telegraphone, a pair of spools disposed on parallel axes, spring means for clasping the end of a wire to each spool, means for positively driving either of said spools whereby the other spindle is rotated through the tension of said wire, said wire being engaged with the respective spools only by the frictional engagement of said spring, whereby it is not broken when unwound from a spool.

20. In a telegraphone, a pair of spools rotatable on parallel axes, a wire passing between said spools, reversible means acting to drive the spool on which the wire is winding under all circumstances, and spring means for frictionally holding the ends of the wire to the spools whereby the wire is not broken when it fully unwinds from a spool.

21. In a telegraphone, a longitudinally movable wire, a motor for driving said wire, and means for stopping the motor when the wire breaks.

22. In a telegraphone, a movable wire, driving means therefor, a laterally movable carrier having a telegraphone magnet, and means on said carrier for stopping said driving means when the wire breaks.

23. In a telegraphone, a pair of spools, a wire movable therebetween, driving means therefor, a reciprocating carrier having a telegraphone magnet, and means on said carrier for stopping said driving means when the wire breaks.

24. In a telegraphone, a movable wire, a driving means therefor, a circuit including a device for stopping said driving means, and a button in the path of said wire and controlling said circuit.

25. In a telegraphone, a continuously movable wire, and a pair of magnets having removable cores engaging said wire, said cores being rigidly connected together.

26. In a telegraphone, a continuously movable wire, means for starting, stopping and reversing the movement thereof, and controlling devices for said means, said controlling devices including a pair of electromagnets having armatures, and means whereby the simultaneous attraction of said armatures stops the movement of the wire, but their separate attraction causes a movement of the wire in a forward or reverse direction respectively.

27. In a telegraphone, a continuously movable record medium, means for driving said record medium, a device acting to start, reverse or stop the action of said means, a pair of electromagnets energized to actuate said device, and means for controlling said electromagnets to start, stop or reverse said record medium.

28. In a telegraphone, a record medium, means for starting, reversing or stopping the same, and a pair of electromagnets associated with said means to stop the record medium when simultaneously energized, said electromagnets respectively acting to start or reverse the record medium when individually energized.

29. In a telegraphone, a continuously movable record medium, means for starting, stopping and reversing the same, a pair of electromagnets, a pair of armatures for controlling said means, one of said armatures being movable into an attracted position where it operates said means to start the record medium, and the other armature being moved into an attracted relation where it operates said means to reverse said record medium.

30. In a telegraphone, a continuously movable record medium, means for starting, stopping and reversing the same, a pair of electromagnets, a pair of armatures for controlling said means, one of said armatures being moved into an attracted position where it operates said means to reverse the record medium, and means for preventing movement of either armature to its said attracted relation when said electromagnets are simultaneously energized.

31. In a telegraphone, a continuously movable record medium, means for starting, stopping and reversing the same, a pair of electromagnets, armatures individually movable to positions to actuate said means to drive the record medium in opposite directions, and means for preventing the movement of either armature when both are simultaneously attracted.

32. In a telegraphone, a continuously movable record medium, means for starting, stopping and reversing the same, a pair of electromagnets, armatures individually movable to positions to actuate said means to drive the record medium in opposite directions, said armatures having extensions with stepped extremities adapted to engage one another to prevent the simultaneous movement of both armatures by their electromagnets.

33. In a telegraphone, a continuously movable record medium, means for driving the same in either direction, devices for starting, stopping and reversing said means, and a pair of electromagnets selectively energized to control said devices for all of their said functions.

34. In a telegraphone, driving means, a controlling device for starting, stopping and reversing said means, a circuit including three wires for operating such device, and three circuit closers two of which connect pairs of said three circuit wires, and the other of which circuit closers connects all of said wires, whereby the telegraphone is controlled.

35. In a telegraphone, driving means, a controlling device for starting, stopping and reversing said means, a circuit including three wires for operating such device, and a plurality of means each including three circuit closers for connecting together different circuit wires, whereby the telegraphone is controlled.

36. In a telegraphone, driving means, a pair of switch elements for operating said means in opposite directions, a pair of electromagnets having armatures for moving said switch elements, and means whereby said driving means is stopped when said armatures are simultaneously attracted by the electromagnets.

37. In a telegraphone, a driving motor, three circuit wires, means for starting said motor when one pair of said circuit wires are connected together, means for reversing the motor when another pair of said circuit wires are connected together, and means whereby the motor is stopped when all of said circuit wires are connected together.

38. In a telegraphone, a movable record medium, four magnets in proximity to said medium, a transmitter in circuit with a pair of said magnets, a receiver in circuit with another pair of said magnets, and a circuit through all of said magnets for erasing and polarizing purposes.

39. In a telegraphone, a movable record medium, a pair of magnets in proximity to said medium, a telephone set in circuit with one of said magnets, a separate telephone set in circuit with the other magnet, and a circuit through both of said magnets for erasing and polarizing purposes.

40. In a telegraphone, a continuously movable record medium, a pair of magnets in proximity to said medium, said magnets each having a pair of windings, a pair of circuits each including a telephone set and respectively including a winding of each of said magnets, and a circuit through both the other windings of said magnets for erasing and polarizing purposes.

41. In a telegraphone apparatus, a manager's station, a stenographer's station having a telegraphone, synchronously moving indicating means at both the manager's station and at the stenographer's station, and means whereby the telegraphone is stopped when the indicator at the stenographer's station moves over a predetermined range in either direction.

42. In a telegraphone apparatus, a manager's station having a telephone set, a stenographer's station having a telegraphone and a telephone receiver, means for reversing the telegraphone, and means for disconnecting the stenographer's telephone receiver from the telegraphone circuit during its reverse movement.

43. In a telegraphone, a transmitting and a receiving circuit, and means for opening the receiving circuit when the telegraphone is reversed.

44. In a telegraphone, a transmitting and a receiving circuit, and frictionally displaced means for opening the receiving circuit when the telegraphone is reversed.

45. In a telegraphone, a transmitting and a receiving circuit, frictionally displaced means operated by the reversal of the telegraphone, and contacts actuated by said frictionally displaced means for opening said receiving circuit when the telegraphone is reversed.

46. In a telegraphone, a transmitting and a receiving circuit, a disk having diagonal slots and frictionally displaced by a reversal of the telegraphone, and means bearing against said disk and adapted to be displaced through said slot for opening said receiving circuit when the telegraphone is reversed.

47. In a telegraphone, driving means, a controlling device for starting, stopping and reversing said means, an indicator for showing the movement of the record medium, a circuit closed to actuate said controlling device to stop the telegraphone when said indicator has finished a predetermined movement, and contacts forming part of said controlling device for opening said circuit when the telegraphone has been stopped.

48. In a telegraphone having a record medium and a telegraphone magnet, a transmitter and a receiver, a relay for establishing transmitting and receiving circuits therefrom to the telegraphone magnet, and a single contact switch for actuating said relay to establish an erasing circuit in lieu of said transmitting and receiving circuits.

49. In a telegraphone apparatus, a manager's station having a telephone set, a stenographer's station having a telegraphone in circuit with said telephone set, means at the manager's station for starting, stopping and reversing the telegraphone, and means at the stenographer's station for first reversing the telegraphone and then automatically stopping it after a predetermined amount of reverse movement.

50. In a telegraphone, driving means, a controlling device for said driving means, and means acting to reverse the telegraphone through a limited predetermined movement when said device is actuated.

51. In a telegraphone having a record medium, means for starting, stopping and reversing the record medium, and means for reversing the record medium and then automatically stopping it after a predetermined amount of reverse movement.

52. In a telegraphone having a record medium, means for reversing the record medium and then automatically stopping it after a predetermined amount of reverse movement.

53. In a telegraphone, driving means, means frictionally displaced by the reverse movement of the telegraphone, a device for reversing said driving means, and means in the path of said frictionally displaced means for stopping said driving means after a predetermined reverse movement.

54. In a telegraphone, driving means, devices for starting, stopping and reversing the same, and another set of three devices one of which starts and another of which reverses the telegraphone, and means actuated by the third of said last mentioned devices for causing a predetermined limited reverse movement of the telegraphone.

55. In a telegraphone, driving means, devices for closing separate circuits to start, stop and reverse said driving means, means displaced after a predetermined reverse movement of the telegraphone, and a device actuated by the movement of said last mentioned means for stopping the telegraphone.

56. In a telegraphone, driving means, devices for closing separate circuits to start, stop and reverse said driving means, means displaced after a predetermined reverse movement of the telegraphone, and a relay actuated by the movement of said last mentioned means for stopping the telegraphone.

57. In a telegraphone, driving means, means displaced by a reverse movement of the telegraphone, contact springs in the path of said last mentioned means, and a relay for stopping the telegraphone and controlled by said contact springs.

58. In a telegraphone, driving means, means displaced by a reverse movement of the telegraphone, contact springs in the path of said last mentioned means, a relay for stopping the telegraphone and controlled by said contact springs, and automatic means for opening the circuits of said relay when the telegraphone stops.

59. In a telegraphone, driving means, a circuit for reversing said driving means, a relay having a circuit closed by the closure of said circuit, means actuated by said relay for causing a predetermined limited reverse movement of the telegraphone, and means for opening said relay circuit when the telegraphone stops.

In witness whereof, I subscribe my signature, in the presence of two witnesses.

EJNAR ALEXANDER HYTTEN.

Witnesses:
VIGGO BLOM,
JAN CRISTOPHERSEN.